(12) United States Patent
Piccardi

(10) Patent No.: US 10,211,724 B1
(45) Date of Patent: Feb. 19, 2019

(54) ELECTRONIC DEVICE WITH AN OUTPUT VOLTAGE BOOSTER MECHANISM

(71) Applicant: Micron Technology, Inc., Boise, ID (US)

(72) Inventor: Michele Piccardi, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/849,052

(22) Filed: Dec. 20, 2017

(51) Int. Cl.
| G05F 1/10 | (2006.01) |
| G06F 1/32 | (2006.01) |
| H02M 3/07 | (2006.01) |

(52) U.S. Cl.
CPC ..................... *H02M 3/07* (2013.01)

(58) Field of Classification Search
CPC .............. H02M 3/07; H02M 3/18; G05F 1/10
USPC .............. 327/148, 157, 534–537; 363/59, 60
See application file for complete search history.

(56) References Cited

U.S. PATENT DOCUMENTS

| 4,311,923 | A |   | 1/1982  | Luescher et al. |           |
|-----------|---|---|---------|-----------------|-----------|
| 5,043,858 | A |   | 8/1991  | Watanabe        |           |
| 5,381,051 | A |   | 1/1995  | Morton          |           |
| 5,493,486 | A |   | 2/1996  | Connell et al.  |           |
| 5,818,289 | A |   | 10/1998 | Chevallier et al. |         |
| 5,936,459 | A |   | 8/1999  | Hamamoto        |           |
| 6,046,626 | A | * | 4/2000  | Saeki ........... | H02M 3/073 |
|           |   |   |         |                 | 327/536   |
| 6,545,529 | B2 |  | 4/2003  | Kim             |           |
| 6,806,761 | B1 |  | 10/2004 | Aude            |           |
| 7,116,154 | B2 |  | 10/2006 | Guo             |           |
| 7,239,193 | B2 |  | 7/2007  | Fukuda          |           |
| 7,576,523 | B2 |  | 8/2009  | Ogawa et al.    |           |
| 7,602,233 | B2 |  | 10/2009 | Pietri et al.   |           |
| 7,652,522 | B2 | * | 1/2010  | Racape ......... | G11C 5/145 |
|           |    |   |         |                 | 327/536   |
| 7,994,844 | B2 |  | 8/2011  | Chen et al.     |           |
| 8,026,755 | B2 |  | 9/2011  | Ni et al.       |           |
| 9,502,972 | B1 | * | 11/2016 | Michal .......... | H02M 3/07 |
| 9,793,794 | B2 |  | 10/2017 | Stauth et al.   |           |

(Continued)

OTHER PUBLICATIONS

U.S. Appl. No. 15/849,098—Unpublished patent application by Michele Piccardi, titled "Electronic Device With a Charge Recycling Mechanism", filed Dec. 20, 2017, 31 pages.

(Continued)

*Primary Examiner* — Brandon S Cole
(74) *Attorney, Agent, or Firm* — Perkins Coie LLP

(57) ABSTRACT

An electronic device includes: a clock booster configured to generate a boosted intermediate voltage greater than a source voltage, wherein the clock booster includes: a controller capacitor configured to store energy for providing a gate signal, wherein the gate signal is for controlling charging operations to generate the boosted intermediate voltage based on the source voltage, and a booster capacitor configured to store energy according to the gate signal for providing the boosted intermediate voltage, wherein the booster capacitor has greater capacitance level than the controller capacitor; and a secondary booster operatively coupled to the clock booster, the secondary booster configured to generate an output voltage based on the boosted intermediate voltage, wherein the output voltage is greater than both the source voltage and the boosted intermediate voltage.

24 Claims, 8 Drawing Sheets

(56) References Cited

U.S. PATENT DOCUMENTS

| | | |
|---|---|---|
| 2006/0290411 A1 | 12/2006 | Smith et al. |
| 2007/0035973 A1* | 2/2007 | Kitazaki ............... H02M 3/073 363/59 |
| 2008/0012627 A1 | 1/2008 | Kato |
| 2008/0122506 A1* | 5/2008 | Racape ................. G11C 5/145 327/157 |
| 2009/0108915 A1 | 4/2009 | Liao |
| 2009/0121780 A1 | 5/2009 | Chen et al. |
| 2009/0174441 A1* | 7/2009 | Gebara ................ H02M 3/073 327/115 |
| 2013/0222050 A1* | 8/2013 | Siao ...................... H02M 3/073 327/536 |
| 2015/0015323 A1 | 1/2015 | Rahman et al. |
| 2016/0268893 A1 | 9/2016 | Dong et al. |
| 2017/0317584 A1 | 11/2017 | Tanikawa |
| 2018/0191243 A1* | 7/2018 | Shay ............. H03K 19/017509 |

OTHER PUBLICATIONS

U.S. Appl. No. 15/849,137—Unpublished patent application by Michele Piccardi, titled "Electronic Device With a Charge Recycling Mechanism", filed Dec. 20, 2017, 32 pages.

\* cited by examiner

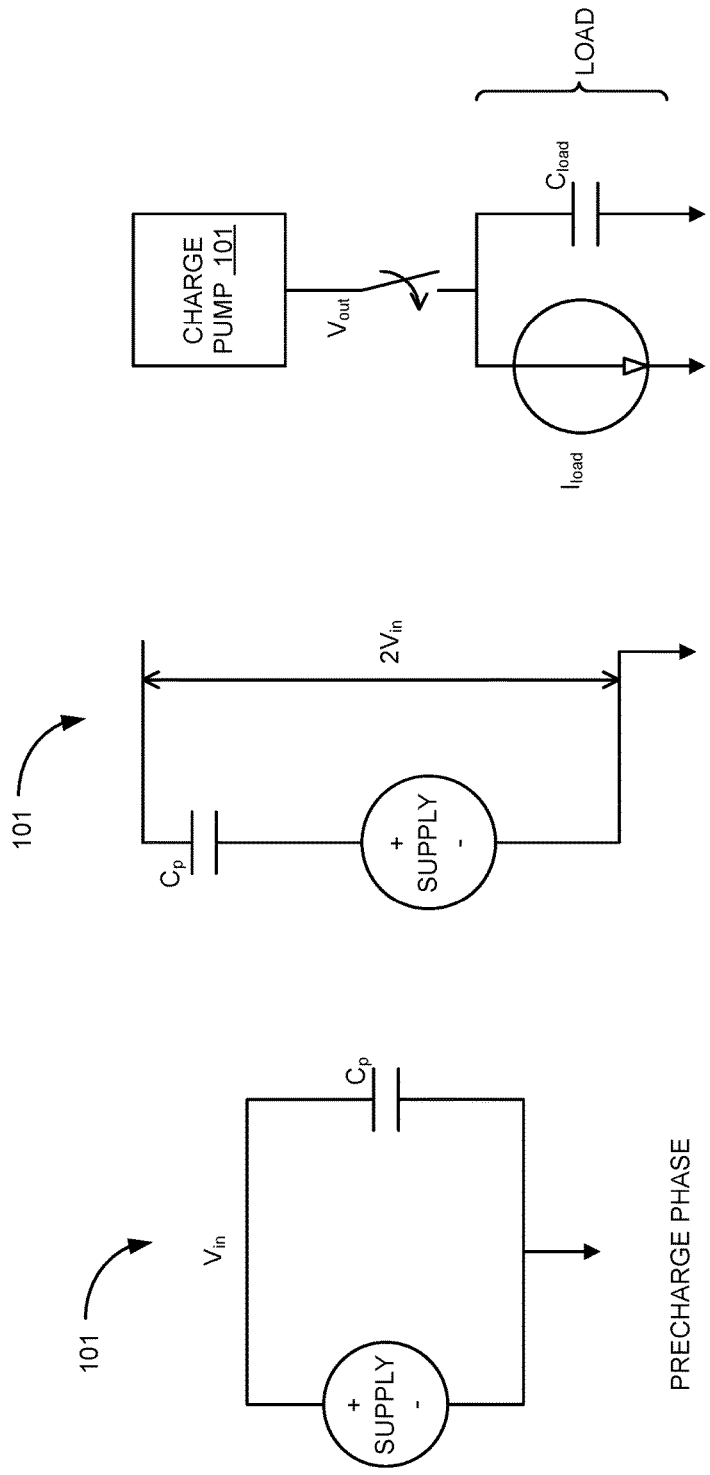

ELECTRONIC DEVICE WITH AN OUTPUT VOLTAGE BOOSTER MECHANISM

RELATED APPLICATION(S)

This application contains subject matter related to a concurrently filed U.S. Patent Application by Michele Piccardi titled "ELECTRONIC DEVICE WITH A CHARGE RECYCLING MECHANISM." The related application is assigned to Micron Technology, Inc., and is identified by Ser. No. 15/849,098. The subject matter thereof is incorporated herein by reference thereto.

This application contains subject matter related to a concurrently filed U.S. Patent Application by Michele Piccardi titled "ELECTRONIC DEVICE WITH A CHARGING MECHANISM." The related application is assigned to Micron Technology, Inc., and is identified by Ser. No. 15/849,137. The subject matter thereof is incorporated herein by reference thereto.

TECHNICAL FIELD

The disclosed embodiments relate to electronic devices, and, in particular, to semiconductor devices with an output voltage booster mechanism.

BACKGROUND

Electronic devices, such as semiconductor devices, memory chips, microprocessor chips, and imager chips, can include a charge pump (e.g., a DC to DC converter that functions as a power source) to create a voltage that is different (e.g., higher or lower) than the available source voltage (e.g., '$V_{dd}$'). Charge pumps can include components (e.g., diodes, switches, comparators, capacitors, resistors, or a combination thereof) that are organized to provide an output voltage that is boosted or reduced from an incoming source voltage.

Some charge pumps can include the components arranged in units or stages (e.g., such that the connections between or relative arrangements of the units can be reconfigured to adjust one or more capabilities of the charge pump). FIG. 1A, illustrates a single stage of a charge pump in an electronic device 101. In a pre-charge phase, an energy storage structure (e.g., one or more capacitors) in the single stage can be charged using an incoming voltage (e.g., '$V_{in}$'). As illustrated in FIG. 1B, the charged storage structure can be reconfigured (e.g., using one or more relays or switches) from a parallel connection with the voltage supply for the pre-charge phase to a series connection with the voltage supply for a boost phase. Accordingly, a resulting output (e.g., '$V_{out}$') can be higher (e.g., '$2V_{in}$') than the incoming voltage level (e.g. '$V_{in}$').

With 'N' number of stages connected in series, the charge pump can produce a maximum voltage ('$V_{max}$') that is further increased or boosted above the voltage level of the supply. The maximum voltage and the corresponding resistance value can be represented as:

$$V_{max} = V_{dd} + N \cdot V_{dd} = (N+1) \cdot V_{dd} \qquad \text{Equation (1).}$$

$$R_{out} = \frac{N}{(f_{clk} \cdot C_p)}. \qquad \text{Equation (2)}$$

For example, the maximum voltage using 'N' stages can be '(N+1)' times greater than the source voltage level of '$V_{dd}$'. Also for example, the corresponding resistance value for the charge pump having 'N' stages in series can correspond to a clock frequency (e.g., '$f_{clk}$') and a capacitance level or value (e.g., '$C_p$') corresponding to the capacitor used in the pump stages.

The output voltage can be used to drive a load as illustrated in FIG. 1C. The boosted output can be connected to the electrical load. The load can draw a current (e.g., as represented '$I_{load}$') and/or drive a load capacitance (e.g., as represented by a capacitance '$C_{load}$'). As such, when the load is connected to the charge pump, the output voltage (e.g., '$V_{out}$') can drop according to the pump capability. Accordingly, multiple units or stages can be connected in series or in parallel to provide and/or maintain a targeted level of voltage, current, power, etc. to the connected load.

FIG. 2A-C are block diagrams of a charging stage of the charging mechanism. FIG. 2A is a block diagram of a portion of a charging stage 202 (e.g., a voltage doubler) of the charging mechanism 101. The charging stage 202 can include an input switch 221, an output switch 222, a first clock switch 223, a second clock switch 224, a charging capacitor 225, or a combination thereof. The components of the charging stage 202 can operate according to a control signal 226 (e.g., 2 phase clock signal) having a first phase 227 (e.g., falling edge and/or a low magnitude portion of the control signal 226, such as a lower half or a negative duty-cycle of the signal) and a second phase 228 (e.g., rising edge and/or a high magnitude portion of the control signal 226, such as a higher half or a positive duty-cycle of the signal).

The charging stage 202 can operate according to the control signal 226 to charge the charging capacitor 225 and provide an output voltage through the output switch 222. For example, two switches (e.g., the input switch 221 and the second clock switch 224) can close at the first phase 227 (e.g., illustrated as '1') while the other two switches (e.g., the output switch 222 and the first clock switch 223) can be open (e.g., for charging the charging capacitor 225). At the second phase 228 (e.g., illustrated '2'), the switches can be in an opposite state (e.g., the input switch 221 and the second clock switch 224 can be open and the output switch 222 and the first clock switch 223 can be closed).

FIG. 2B is a block diagram of a portion of a charging stage 203 (e.g., a complementary doubler). The charging stage 203 can include the charging stage 202 (e.g., the voltage doubler illustrated in FIG. 2A) and a complementary stage 204 (e.g., a circuit complementary to the circuit 202). The complementary stage 204 can include identical components as the circuit 202, such as an input switch 231, an output switch 232, a first clock switch 233, a second clock switch 234, a charging capacitor 235, or a combination thereof.

The complementary stage 204 can operate at opposite phase or polarity than the circuit 202. For example, when the input switch 221 and the second clock switch 224 of the circuit 202 close at the first phase 227, the corresponding portions of the complementary stage 204 (e.g., the input switch 231 and the second clock switch 234) can be open. When the output switch 222 and the first clock switch 223 of the circuit 202 close at the second phase 228, the corresponding portions of the complementary stage 204 (e.g., the output switch 232 and the first clock switch 233) can be open.

FIG. 2C is a block diagram of a portion of a charging stage 205 (e.g., a clock doubler, such as a 2-phase NMOS clock doubler). The charging stage 205 can use NMOS for input switch (e.g., the input switch 221 and/or the input switch 231). For illustrative purposes, the output switches (e.g., the output switch 222 and/or the output switch 232) are not shown. However, it is understood that the charging stage 205 can include output switches (e.g., NMOS or PMOS transistors corresponding to the output switch 222 and/or the output switch 232). The clock switches can be abstracted or replaced by complementary clock signals (e.g., represented as 'CLK' and '!CLK').

The portion of the charging stage 202 can include a first switch 262 (e.g., a first transistor, such as an NMOS transistor), a second switch 264 (e.g., a second transistor, such as an NMOS transistor), a first energy storage structure 272 (e.g., a first capacitor), a second energy storage structure 274 (e.g., a second capacitor), etc. For example, a portion (e.g., drain) of the first and second switches can be connected to the input voltage (e.g., '$V_{dd}$'). A different or opposing portion (e.g., source) of the first switch can be connected to the first energy storage structure and an emitter or source portion of the second switch can be connected to the second energy storage structure. A control portion (e.g., gate) of the first switch can also be connected to the emitter or source portion of the second switch and the second energy storage structure, and a gate or base portion of the second switch can be connected to the emitter or source portion of the first switch and the first energy storage structure. The first energy storage structure can further be connect to a clock signal (e.g., 'CLK') and the second energy storage structure can further be connected to an opposite or a negated form of the clock signal (e.g., '!CLK'). The two switches can function complementary to each other based on the opposing clock and negated clock signals and produce an output voltage (e.g., '$V_{out}$') greater (e.g., by a factor of two) than the input voltage (e.g., '$V_{dd}$').

The desired condition for the charging stage (e.g., the charging stage 202, 203, and/or 205) is to achieve the required maximum voltage ('$V_{max}$') based on having the pre-charge voltage ('$V_{precharge}$') reach the supply voltage ('$V_{dd}$') in half of a clock cycle ('$0.5T_{CLK}$') when the gate voltage ('$V_g$') is twice the supply voltage ('$2V_{dd}$'). Ideally, the top plate/node of the charging capacitor should reach the supply voltage (e.g., $V_{precharge}=V_{dd}$) for the first phase 227. In the second phase 228, the bottom plate/node can change from zero volt to the supply voltage to cause the tope plate to reach twice the supply voltage (e.g., $2V_{dd}=V_{max}$).

However, as illustrated in FIG. 2C, the clock doubler (e.g., 2-phase NMOS doubler) can include inefficiencies and losses that hinder the desired condition. For example, as illustrated by a dotted line (e.g., '•••'), the clock doubler can be affected by a loading loss associated with supplying energy (e.g., such as when an output current, such as '$I_{out}$', flows) to a connected device or unit (e.g., a further booster). As the current sinks, a gate voltage (e.g., '$V_g$') also reduces (e.g., below '$2V_{dd}$'). Also for example, as illustrated by a dotted-dashed line (e.g., '-••-••'), the clock doubler can be affected by a semiconductor processing loss (e.g., based on voltage/current relationship of the physical implementation of the input switches). Also for example, as illustrated by a dashed line (e.g., '---'), the clock doubler can be affected by physical layout of the circuits and/or parasitic resistance from the connections.

For illustrative purposes, the various losses/loads are shown on one side of the complementary doubler in FIG. 2. However, it is understood that the various losses/loads can impact both/either side of the complementary doubler.

FIG. 3 is a graphical representation of a relationship between a pre-charge current (e.g., current flowing across the input switch during the phase in which such switch is active, such as a precharge current shown as '$I_{precharge}$') and a potential energy loss for the charging mechanism (e.g., a reduction in magnitude of the voltage at which the top plate of the capacitor must be precharged during the phase in which the input switches are active, where the reduction can translate in energy loss for the charging mechanism). FIG. 3 illustrates the loading loss (e.g., represented by a dotted line '•••'), the processing loss (e.g., represented by a dotted-dashed line '-••-••'), and the loss from parasitic resistance and/or the physical layout (e.g., represented by a dashed line '---') in relationship to the pre-charge current ('$I_{precharge}$'). For example, assuming switches are implemented with NMOS transistor, the losses can be represented based on the following equations:

$$\text{LOADING}: \Delta_{Vloading} = \frac{I_{out}(0.5\ T_{CLK})}{C_p}, \quad \text{Equation (3)}$$

$$\text{PROCESS}: \Delta_{Vsaturation} = V_{th} + \left(\frac{2I_{precharge}}{\beta}\right)^{1/2}, \quad \text{Equation (4)}$$

$$\text{PROCESS}: \Delta_{VIR} = RI_{precharge} \quad \text{Equation (5).}$$

A term $\beta$ can represent a function of carrier mobility, oxide capacitance and devices sizes, while R is symbolically representing any parasitic resistor of the connections in the physical implementation of the clock doubler. As such, the overall loss can be characterized as:

$$V_{precharge}=V_g-\text{LOADING loss}-\text{PROCESS loss}-\text{LAYOUT loss.} \quad \text{Equation (6).}$$

$$V_{precharge} = \quad \text{Equation (7).}$$
$$V_g - \frac{I_{out}(0.5\ T_{CLK})}{C_p} - V_{th} - \left(\frac{2I_{precharge}}{\beta}\right)^{1/2} - IR \le V_{dd}.$$

The voltage loss increases as the precharge current increases, which is the case when either the pump capacitors increase in size or the clock frequency increases to deliver a corresponding reduction in charge pump equivalent resistance. Accordingly, the voltage loss can cause a cascading impact on the required output voltage. Traditional method of compensating for the voltage loss has been to increase the number of stages.

BRIEF DESCRIPTION OF THE DRAWINGS

FIGS. 1A-C are block diagrams of an electronic device including a charging mechanism.

DETAILED DESCRIPTION

The technology disclosed herein relates to electronic devices (e.g., semiconductor-level devices, sets of analog circuitry components, etc.), systems with electronic devices, and related methods for operating electronic devices in association with charge pumps and/or voltage booster mechanism (e.g., clock doubler) therein. The electronic devices can include a clock doubler (e.g., a 2-phase NMOS clock doubler) in each stage, and each clock doubler can include a controller portion and a separate booster portion (e.g., such as for a master-slave configuration). The controller portion (e.g., 'master' circuitry having a comparatively smaller capacitor) can drive or signal the booster portion (e.g., 'slave' circuitry having a comparatively larger capacitor) to produce the output voltage. The separation of the two portions with different size capacitors can reduce the various losses associated with the clock doubler, and further provide increased efficiency based on reducing the number of stages that are necessary to meet the target output voltage.

Figure 4:
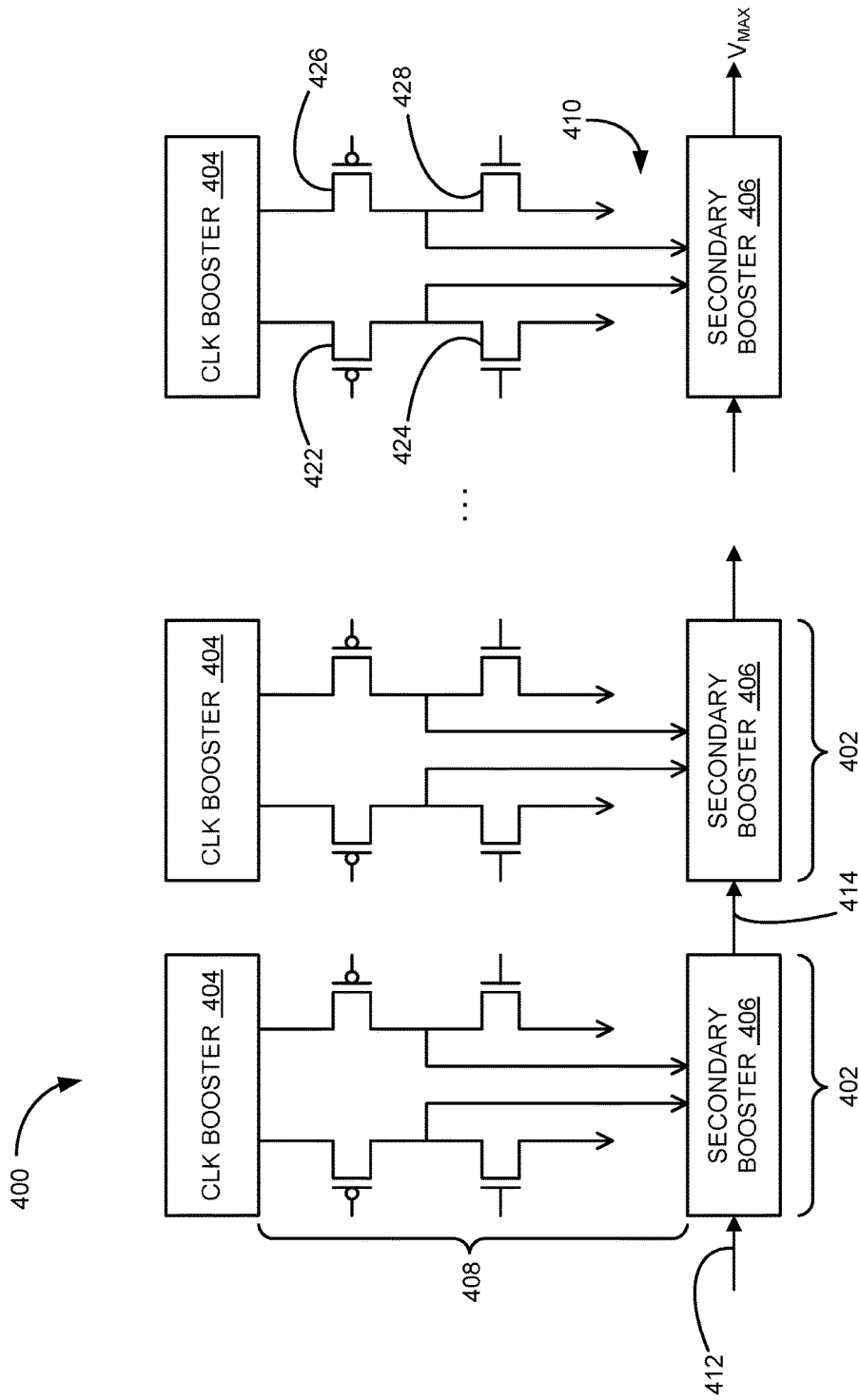
FIG. 4 is a block diagrams of an electronic device including an output booster mechanism in accordance with an embodiment of the present technology.

FIG. 4 is a block diagram of an electronic device 400 (e.g., a multi-stage charge pump) including an output booster mechanism in accordance with an embodiment of the present technology. The electronic device 400 (e.g., a semiconductor device, an integrated circuit, a wafer or silicon level device, a set of digital and/or analog circuitry, etc.) can include a charge pump (e.g., a DC to DC converter, including one or more capacitors to store energy, that functions as a power source using various different internal configurations, arrangements, or electrical connections to provide an output voltage ("$V_{out}$")). The charge pump can include multiple charging stages 402 (e.g., units of circuits, devices, components, etc. configured to produce a voltage greater than the input) connected in series.

Each of the charging stages 402 (e.g., double boosted charge pump circuits) can include a clock booster 404 (e.g., an output booster, such as a clock doubler), a secondary booster 406 (e.g., a Favrat booster), and a switching module 408 (e.g., a system or a set of switches and electrical connections). The clock booster 404 can be electrically coupled to the secondary booster 406 through the switching module 408. For example, a boosted intermediate voltage 410 (e.g., an intermediate voltage, such as '$2V_{dd}$', that is greater than and/or boosted from a source input voltage, such as '$V_{dd}$',) from the clock booster 404 can be routed through the switching module 408 and provided as an input at the secondary booster 406. The secondary booster 406 can use the boosted intermediate voltage 410 from the clock booster 404 to further increase a previous stage input voltage 412 (e.g., '$V_{dd}$' for the first stage or a stage output 414 from a preceding secondary booster for subsequent stages). The stage output voltage 414 resulting from boosting the stage input voltage can be provided as an input voltage to the subsequent stage (e.g., as the stage input to subsequent instance of the secondary booster or as an output to the load).

In some embodiments, the switching module 408 can include multiple switching paths including one or more switches (e.g., NMOS transistors), one or more complementary switches (e.g., PMOS transistors), or a combination thereof. For example, the switching module 408 can include a first PMOS transistor 422 connected to the clock booster 404 on one end and a first NMOS transistor 424, the secondary booster 406, or a combination thereof on an opposing end. The switching module 408 can further include a second PMOS transistor 426 connected to the clock booster 404 on one end and a second NMOS transistor 428, the secondary booster 406, or a combination thereof on an opposing end.

The charging stages 402 including the clock booster 404 and the switching module 408 (e.g., for providing a voltage greater than the input voltage, such as '$2V_{dd}$') with the secondary booster 406 provides increased charging efficiency. In comparison to the traditional switch pumps (e.g., as illustrated in FIGS. 1A-1C), the charge pump illustrated in FIG. 4 can reduce the number of stages (e.g., by a factor of 2) necessary to produce the same target voltage and the corresponding resistance. For example, in contrast to Equations (1) and (2), the maximum voltage and the corresponding resistance value of the electronic device 400 can be represented as:

$$V_{max} = V_{dd} + N/2 \cdot 2V_{dd} \qquad \text{Equation (8).}$$

$$R_{out} = \frac{N}{2(f_{clk} \cdot C_p)}. \qquad \text{Equation (9)}$$

Figure 5:
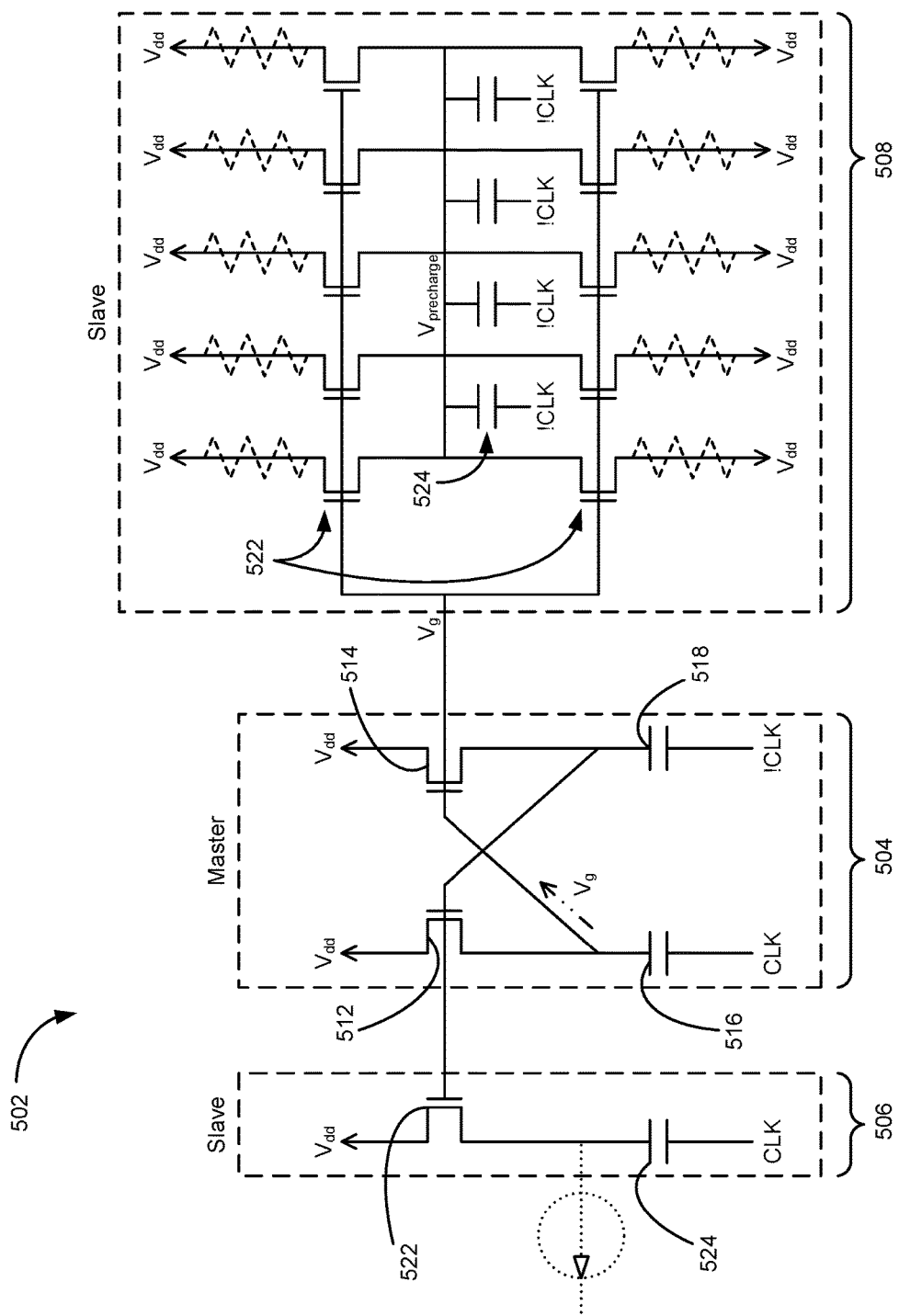
FIG. 5 is an example circuit diagram of a clock booster in accordance with an embodiment of the present technology.

FIG. 5 is an example circuit diagram of a clock booster 502 (e.g., 2-phase NMOS clock doubler) in accordance with an embodiment of the present technology. FIG. 5 can illustrate a detailed example of the clock booster 404 in FIG. 4. The clock booster 502 can include a controller or a master portion 504 ("master-controller 504") and voltage booster or slave portions (e.g., first slave-booster 506 and second slave-booster 508). The master-controller 504 can be configured to control the slave-booster portions according to phase or timing associated with the clock signal (e.g., for controlling the gate voltage '$V_g$' according to the clock signal 'CLK' and '!CLK'). The slave-booster portions can be configured to produce an output voltage ('$V_{precharge}$') greater than or boosted from the input voltage '$V_{dd}$'.

To control the slave-booster, the master-controller 504 can include control switches (e.g., a set of NMOS transistors) configured to control charging operations of the clock booster 502 (e.g., the slave-booster portions). For example, the control switches can include a first control switch 512 and a second control switch 514. The first control switch 512 and the second control switch 514 can be connected to the input voltage at one end (e.g., at the drain portions). The control switches can further be connected to each other, such as by having an opposite end (e.g., the source portion) of the first control switch 512 connected to a control portion (e.g., the gate portion) of the second control switch 514. Similarly, the opposite end or the source on the second control switch 514 can be connect to a control portion or the gate on the first control switch 512.

The master-controller 504 can further include energy storage structures (e.g., a set of capacitors) that are directly connected to the opposite portions and the gate portions of control switches. For example, a first control capacitor 516 can be connected to the source of the first control switch 512 and the gate of the second control switch 514 on one terminal, and further connected to a clock signal (e.g., "CLK") at an opposing terminal. Also, a second control capacitor 518 can be connected to the source of the second control switch 514 and the gate of the first control switch 516 on one terminal, and further connected to an opposite or a negated form of the clock signal (e.g., "!CLK") at an opposing terminal.

Figures 2A, 2B, 2C:
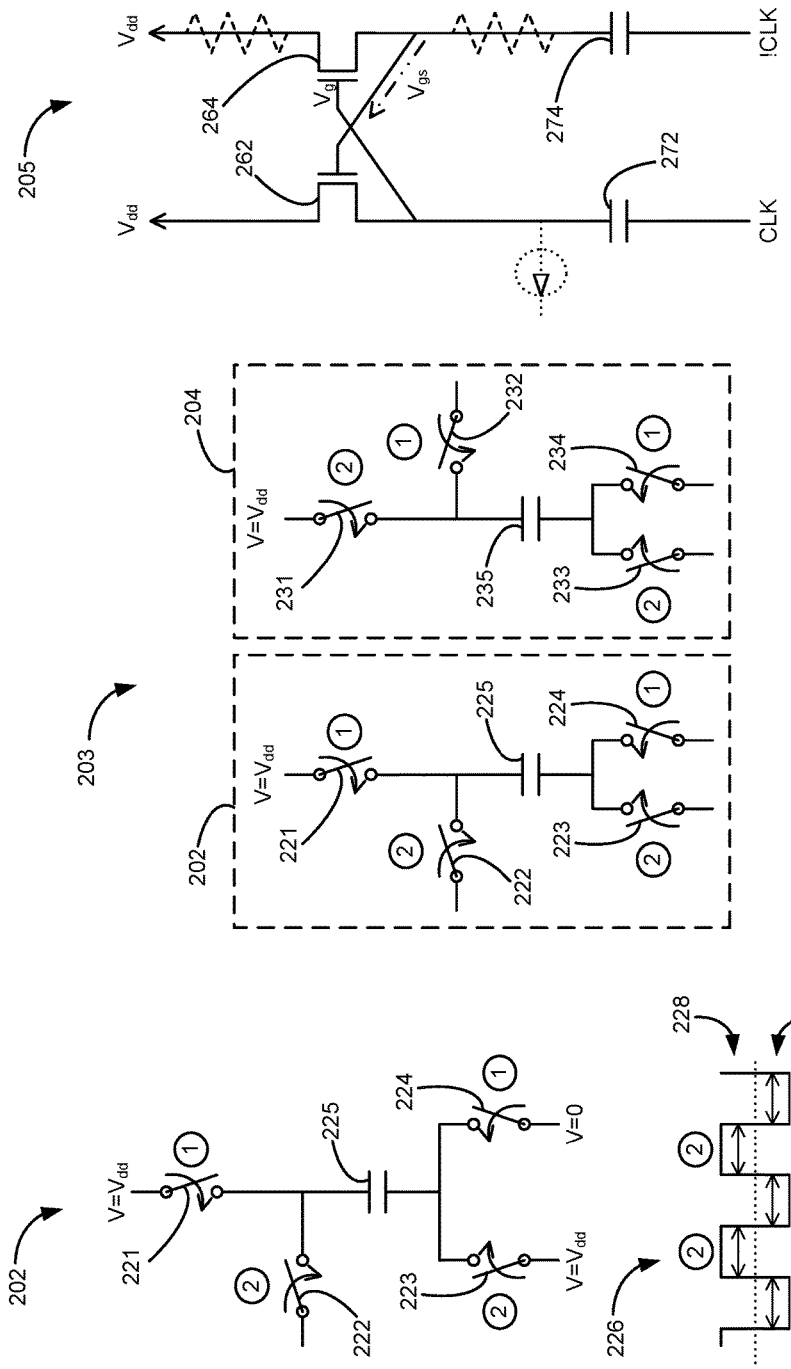
FIGS. 2A-C are block diagrams of a charging stage of the charging mechanism.
Figure 3:
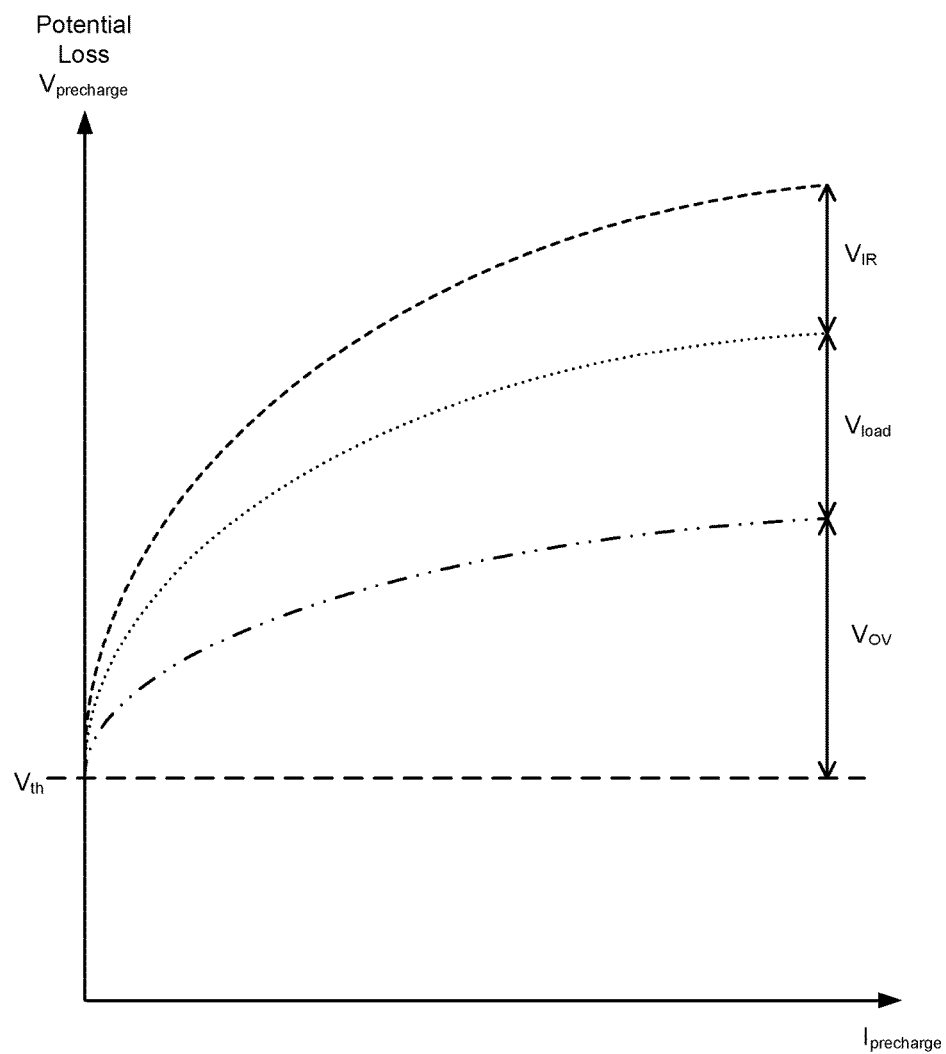
FIG. 3 is a graphical representation of a relationship between a pre-charge current and a potential energy loss for the charging mechanism.

The switches and the capacitors of the master-controller 504 can operate similar (e.g., complementary operations of the switches used to boost the output voltage) to other designs of charging stages or clock doublers, such as the charging stage 202 of FIG. 2. However, the first control capacitor 516 and the second capacitor 518 can have capacitance levels that are smaller (e.g., by a factor of 2 or greater, such as 10, 20, 40, 60, or any number greater than 60) than that of capacitors used in the other designs. Using the master-controller 504 and the slave-boosters, the clock booster 502 can separate the phase or timing based control (e.g., function of the master-controller 504) and the voltage boosting function (e.g., function of the slave-boosters) into separate portions or circuits. As such, the capacitance levels of the control capacitors can be drastically reduced when compared to similarly-located capacitors in the charging stage of FIG. 2 (e.g., since, unlike in those designs, they are not used to drive the output voltage and/or current).

To produce the boosted intermediate voltage 410, the master-controller 504 can control the charging operations of the slave boosters (e.g., the first slave-booster 506 and the second slave-booster 508). The slave boosters can each include one or more controllers (e.g. booster switches 522) connected to the master-controller 504. For example, the gates of the booster switches 522 in the first slave-booster 506 can be connected to the gate of the first control switch 512, the source of the second control switch 514, and the second controller capacitor 518. Also for example, the gates of the booster switches in the second slave booster 508 can be connected to the gate of the second control switch 514, the source of the first control switch 512, and the first controller capacitor 516. Based on the connection to the master-controller 504, the booster switches 522 can operate similar to the control switches, such as by having the booster switches 522 of the second slave-booster 508 turning on or off according to the gate signals.

The booster switches 522 can be directly connected to the input source (e.g., at the drains) and booster capacitors 524 at opposing terminals (e.g., at the sources). The booster capacitors 524 can be further connected to the clock signal (e.g., for the booster capacitors 524 in the first slave booster 506) or the opposite or the negated form of the clock signal (e.g., for the booster capacitors 524 in the second slave booster 508) at a terminal opposite the input source. The booster capacitors 524 can be configured to drive the boosted intermediate voltage 410 (e.g., voltage and/or current) for the secondary booster 406 of FIG. 4 (e.g., illustrated by dotted lines in FIG. 5), and as such, the booster capacitors 524 can have capacitance levels that are much greater (e.g., by a factor of 10 or greater) than capacitance levels of the first control capacitor 516 and/or the second control capacitor 518.

The slave-boosters can include multiple booster switches, multiple booster capacitors, or a combination thereof. In some embodiments, the slave boosters can include one booster switch one booster capacitor, such as illustrated for the first slave-booster 506 in FIG. 5. In some embodiments, the slave boosters can include multiple booster switches 522 connected to each of the booster capacitors 524, such as illustrated for the second slave-booster 508 in FIG. 5. In some embodiments, the slave boosters can include multiple booster capacitors 524 and/or multiple circuit groupings each including a booster capacitor, where the multiple booster capacitors 524 are connected in parallel, such as illustrated for the second slave-booster 508 in FIG. 5.

For illustrative purposes, the first slave-booster 506 and the second slave-booster 508 are illustrated as having different number of circuit components. However, it is understood that the slave-boosters in the clock booster 502 can be similar to each other (e.g., number and/or arrangement of components).

The master-slave configuration for the clock booster 502 (e.g., including the master-controller 504 and one or more slave-boosters) provides increased efficiencies and reduced losses. The master-slave configuration can separate the load (e.g., the secondary booster 406) from the controller capacitors (e.g., no direct connection), such that the load is driven by the booster capacitors 524. Accordingly, unlike the LOADING loss described in Equation (3) and FIG. 2, the separation can allow the gate signal to remain unaffected by the loading, thereby reducing the loading loss.

Further, the master-slave configuration can reduce the PROCESS losses based on reducing the capacitance level associated with the gate signal. Based on removing the gate signal from directly driving the load, the control capacitors can process the control signal with reduced capacitance levels (e.g., by a factor of 2 or greater, such as 10, 20, 40, 60, or any number between 10-60, or any number greater than 60) in comparison to existing designs (e.g., capacitors illustrated in FIG. 2). As such, the current associated with the control capacitors and the gate signals can be reduced, which can further reduce the saturation loss.

Moreover, the master-slave configuration can reduce the LAYOUT loss (e.g., as illustrated in FIG. 2). Based on reducing the current associated with the gate signal as discussed above, the voltage drop caused by parasitic resistances in the master controller 504 reduces accordingly. Parasitic resistances can be further attenuated (e.g., for the slave-boosters) based on evenly or substantially uniformly distributing (e.g., based on physically arranging the components with regular or patterned spacing between the components, based on forming the components with similar size/capacity/dimension, etc.) the circuit components (e.g., the booster switches 522 and the booster capacitors 524), such as along a silicon layer or wafer.

For illustrative purposes, the various losses (e.g., PROCESS, LAYOUT, and LOADING) are shown using dotted and/or dashed lines in FIG. 5. However, it is understood that the structures (e.g., resistors or current sinks) represented by the dotted and/or dashed lines can be absent from or not part of the clock booster 502.

Figure 6A:
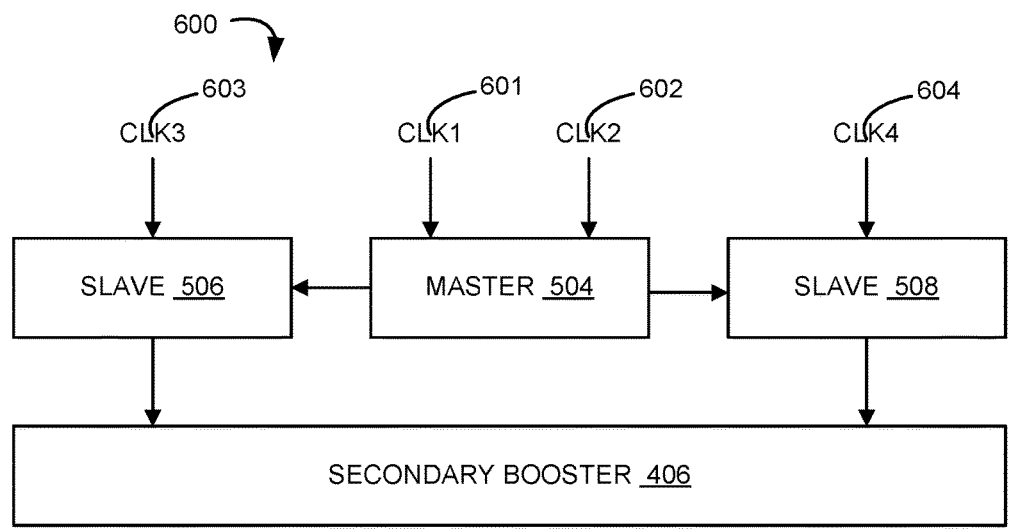
FIGS. 6A-C illustrate example input signals in accordance with an embodiment of the present technology.
Figure 6B:
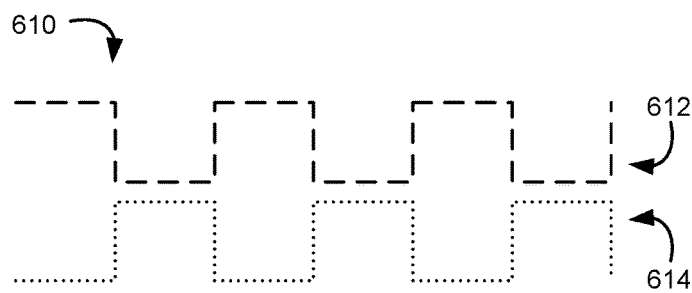
Figure 6C:
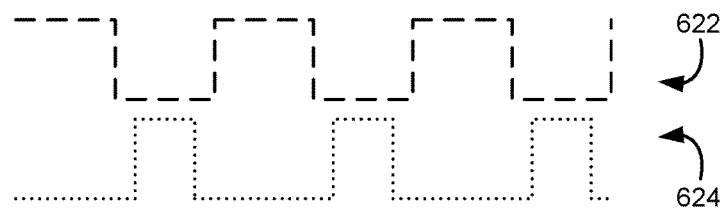

FIG. 6A-C illustrate example input signals in accordance with an embodiment of the present technology. FIG. 6A illustrates a signal input diagram 600. The signal input diagram 600 can illustrate the input signals (e.g., clock signal, the negated signal, a derivative thereof, etc.) for the electronic device 400 of FIG. 4 or a portion therein (e.g., the clock booster 502 of FIG. 5). For example, the master-controller 504 can use/receive a first clock signal 601 (e.g., the clock signal) and a second clock signal 602 (e.g., the negated signal). The first slave-booster 506 can use/receive a third clock signal 603 (e.g., the negated signal or a derivative thereof). The second slave-booster 508 can use/receive a fourth clock signal 604 (e.g., the clock signal or a derivative thereof). In some embodiments, the third clock signal 603 can be non-overlapped and negated form of the fourth clock signal 604. In some embodiments, the third clock signal 603 and the fourth clock signal 604 can be separate or independent from the first clock signal 601 and the second clock signal 602. In some embodiments, the first clock signal 601 can be same as or equal to the third clock signal 603 and/or the second clock signal 602 can be same as or equal to the fourth clock signal 604.

FIG. 6B illustrates a signal timing diagram 610. The signal timing diagram 610 can illustrate a relative timing between a clock signal 612 (e.g., the first clock signal 601, the third clock signal 603, or a combination thereof) and a negated signal 614 (e.g., the second clock signal 602, the fourth clock signal 604, or a combination thereof). The negated signal 614 can be a negated form of the clock signal 612.

FIG. 6C illustrates a further signal timing diagram 620. The signal timing diagram 610 can illustrate a relative timing between a clock signal 622 (e.g., the first clock signal 601, the third clock signal 603, or a combination thereof) and a negated signal 624 (e.g., the second clock signal 602, the fourth clock signal 604, or a combination thereof). The negated signal 624 can be a negated and non-overlapped form of the clock signal 622. The clock signal 622 and/or the negated signal 624 can have a duty cycle, a duration, a pulse width, a shape, etc. that is different (e.g., shorter or narrower) than the clock signal 612 and/or the negated signal 614 (e.g., in comparison to the signals illustrated in FIG. 6B). In some embodiments, the clock signal 622 and the negated signal 624 can have a duty cycle, a duration, a pulse width, a shape, etc. that is different from each other. In some embodiments, the clock signal 622 and the negated signal 624 can have a duty cycle that is different from 50%.

Figure 7:
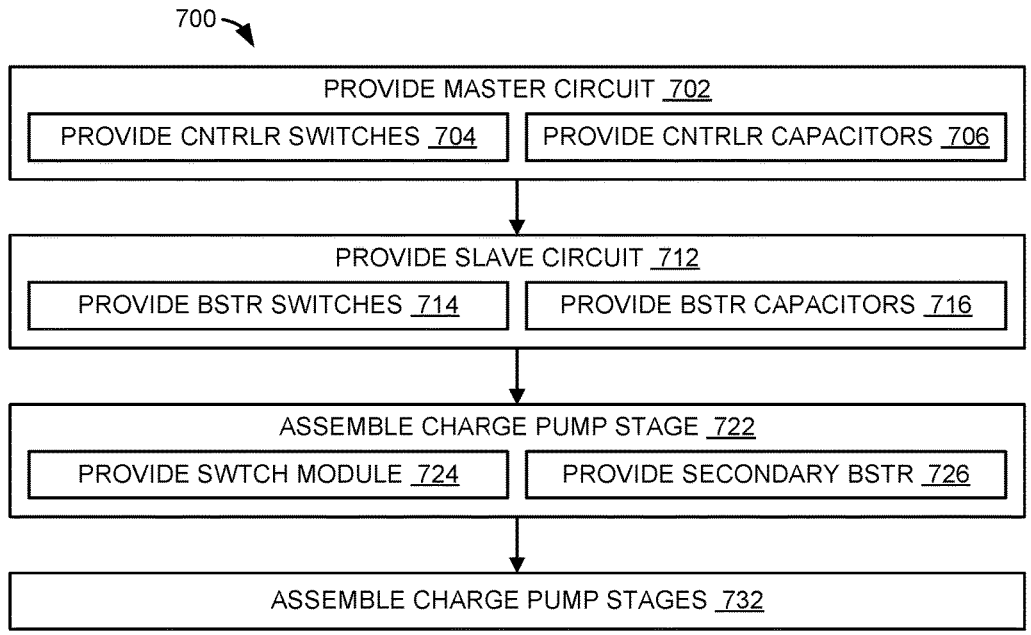
FIG. 7 illustrates an example method of manufacturing an electronic device in accordance with embodiments of the present technology.

FIG. 7 illustrates an example method 700 of manufacturing an electronic device in accordance with embodiments of the present technology. The method 700 can be for manufacturing the electronic device 400 of FIG. 4 or a portion therein, such as the clock booster 502 of FIG. 5.

At block 702, a master/controlling circuit can be provided for controlling charging operations to generate the boosted intermediate voltage 410 of FIG. 4. The master/controlling circuit (e.g., the master-controller 504 of FIG. 5) can be provided based on forming circuitry (e.g., such as based on forming the circuitry in one or more silicon wafers or layers) and/or assembling circuitry components. For example, at block 704, controller switches (e.g., the first controller switch 512 of FIG. 5, the second controller switch 514 of FIG. 5, etc.) can be provided. Also for example, at block 706, controller capacitors (e.g., the first controller capacitor 516 of FIG. 5, the second controller capacitor 518 of FIG. 5, etc.) can be provided. The controller switches and/or the controller capacitors can be arranged and/or connected as illustrated in FIG. 5 and discussed above.

At block 712, a slave/charging circuit can be provided for implementing the charging operations to generate the boosted intermediate voltage 410. The slave/charging circuit (e.g., the first slave-booster 506 of FIG. 5, the second slave-booster 508 of FIG. 5, etc.) can be provided based on forming circuitry and/or assembling circuitry components. For example, at block 714, booster switches (e.g., the booster switches 522 of FIG. 5) can be provided. Also for example, at block 716, controller capacitors (e.g., the booster capacitors 524 of FIG. 5) can be provided. The booster switches and/or the booster capacitors can be arranged and/or connected as illustrated in FIG. 5 and discussed above.

At block 722, one or more stages or units of charge pumps (e.g., instances of the charge stage 402 of FIG. 4) can be assembled. The charge stage 402 can be assembled based on forming circuitry and/or assembling circuitry components for generating the stage output voltage 414 based on further boosting the boosted intermediate voltage 410. For example, at block 724, switch modules (e.g., the switching module 408 of FIG. 4) can be provided for routing the boosted intermediate voltage 410 to secondary boosters. Also for example, at block 726, the secondary boosters (e.g., the secondary booster 406 of FIG. 4, such as Favrat boosters) can be provided for generating the stage output voltage 414 based on using and/or further boosting the boosted intermediate voltage 410. The switch modules and the secondary boosters can be arranged and/or connected as FIG. 4 and discussed above.

At block 732, the multiple charge pump units can be assembled or connected to generate a targeted voltage (e.g., '$V_{MAX}$'). Multiple instances of the charge stages can be connected (e.g., based on forming at silicon level or at component assembly level) in a series connection, such as illustrated in FIG. 4 and discussed above. The charge stages can be connected such that the stage output voltage 414 of FIG. 4 of one charge pump stage can be the previous stage input voltage 412 of FIG. 4 of the next charge pump stage in the sequential or serial connection. As such, the stage output voltage 414 can be amplified or boosted across each charge stage to generate the targeted voltage.

Figure 8:
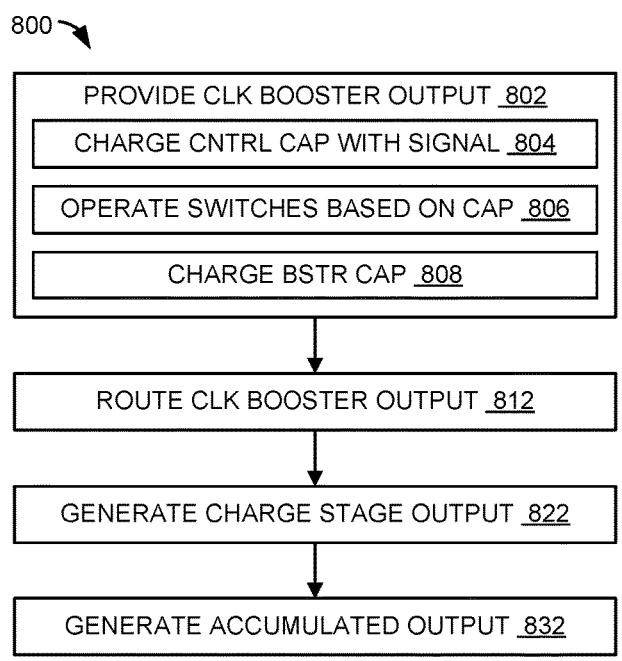
FIG. 8 illustrates an example method of operating an electronic system in accordance with embodiments of the present technology.

FIG. 8 illustrates an example method 800 of operating an electronic system in accordance with embodiments of the present technology. The method 800 can be for operating the electronic device 400 of FIG. 4 or a portion therein, such as the clock booster 502 of FIG. 5 and/or the clock booster 404 of FIG. 4.

At block 802, the clock booster 502 can provide clock booster output. The clock booster 404 of FIG. 4, the clock booster 502 of FIG. 5, or a combination thereof can generate the clock booster output based on source input (e.g., '$V_{dd}$'), the clock signal, and the negated signal.

For example, at block 804, the clock booster 502 can charge the control capacitors (e.g., the first controller capacitor 516 of FIG. 5, the second controller capacitor 518 of FIG. 5, etc.) based on the clock signal and/or the negated signal. At block 806, the voltage level of the control capacitors can operate the switches (e.g., the booster capacitors 524 of FIG. 5, the first controller capacitor 516, the second controller capacitor 518, or a combination thereof) that have their gates connected thereto. Based on operating the switches, at block 808, the booster capacitors 524 of FIG. 5 can be charged using the source input and either the clock signal or the negated signal that is complementary to the signal connected to the control capacitor and driving the gate voltage. Further, the operation of the switches can further affect the charges on the control capacitors, such as by connecting the source input to a terminal opposite the clock signal or the negated signal. Accordingly, the clock booster 502 can generate the boosted intermediate voltage 410 (e.g., effectively doubling the source input) based on or from charging the booster capacitors 524.

At block 812, the switching module 408 of FIG. 4 can route (e.g., according to the clock signal, the negated signal, etc.) the output of the booster capacitors 524 (e.g., the boosted intermediate voltage 410 from a double boosted clock doubler) to the secondary booster 406 of FIG. 4. For example, the switching module 408 can operate a set of switches (e.g., the first PMOS transistor 422 of FIG. 4, the first NMOS transistor 424 of FIG. 4, the second PMOS transistor 426 of FIG. 4, the second NMOS transistor 428 of FIG. 4, or a combination thereof) to provide the boosted intermediate voltage 410 as an input to the secondary booster 406.

At block 822, the secondary booster 406 can generate a charge stage output (e.g., the stage output voltage 414 of FIG. 4) for the charge stage 402. The secondary booster 406 (e.g., a Favrat booster) can generate the stage output voltage 414 based on the previous stage input voltage 412 of FIG. 4 (e.g., the stage output voltage 414 of FIG. 4 from a preceding instance of the charge stage or input source), the boosted intermediate voltage 410, etc.

At block 832, the charge pump (e.g., the electronic device 400) can generate an accumulated output (e.g., '$V_{MAX}$'). Through the series connection of the secondary boosters, the charge pump can aggregate and/or compound the voltage increase across the multiple charge stages to generate the accumulated output.

Figure 9:
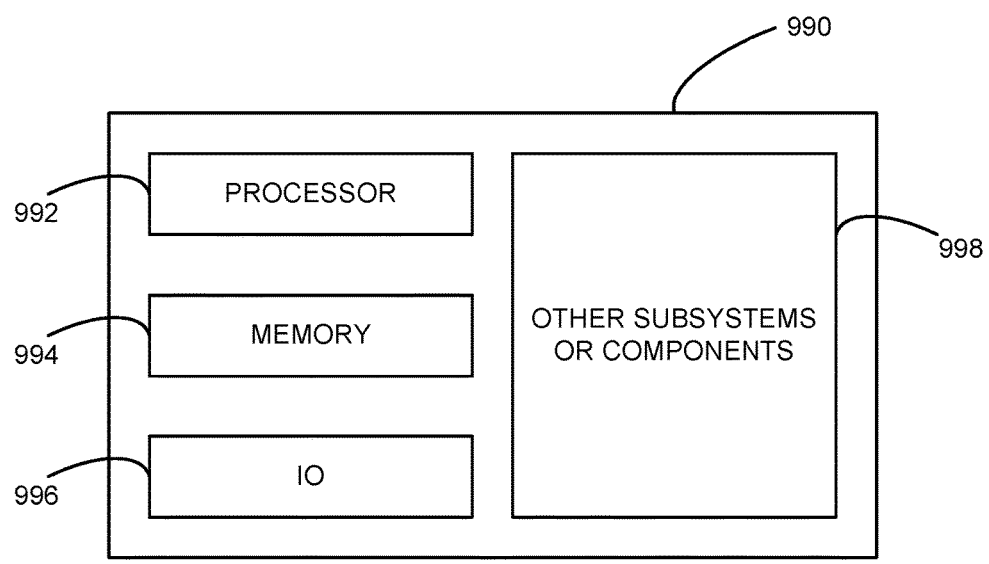
FIG. 9 is a schematic view of a system that includes an electronic device in accordance with embodiments of the present technology.

FIG. 9 is a schematic view of a system that includes an electronic device in accordance with embodiments of the present technology. Any one of the semiconductor devices having the features described above with reference to FIGS. 1-8 can be incorporated into any of a myriad of larger and/or more complex systems, a representative example of which is system 990 shown schematically in FIG. 9. The system 990 can include a processor 992, a memory 994 (e.g., SRAM, DRAM, flash, and/or other memory devices), input/output devices 996, and/or other subsystems or components 998. The semiconductor assemblies, devices, and device packages described above with reference to FIGS. 1-8 can be included in any of the elements shown in FIG. 9. The resulting system 990 can be configured to perform any of a wide variety of suitable computing, processing, storage, sensing, imaging, and/or other functions. Accordingly, representative examples of the system 990 include, without limitation, computers and/or other data processors, such as desktop computers, laptop computers, Internet appliances, hand-held devices (e.g., palm-top computers, wearable computers, cellular or mobile phones, personal digital assistants, music players, etc.), tablets, multi-processor systems, processor-based or programmable consumer electronics, network computers, and minicomputers. Additional representative examples of the system 990 include lights, cameras, vehicles, etc. With regard to these and other examples, the system 990 can be housed in a single unit or distributed over multiple interconnected units, e.g., through a communication network. The components of the system 990 can accordingly include local and/or remote memory storage devices and any of a wide variety of suitable computer-readable media.

From the foregoing, it will be appreciated that specific embodiments of the present technology have been described herein for purposes of illustration, but that various modifications may be made without deviating from the disclosure. In addition, certain aspects of the disclosure described in the context of particular embodiments may be combined or eliminated in other embodiments. Further, while advantages associated with certain embodiments have been described in the context of those embodiments, other embodiments may also exhibit such advantages. Not all embodiments need necessarily exhibit such advantages to fall within the scope of the present disclosure. Accordingly, the disclosure and associated technology can encompass other embodiments not expressly shown or described herein.

I claim:

1. An electronic device, comprising:
   a clock booster configured to generate a boosted intermediate voltage greater than a source voltage, wherein the clock booster includes a master-slave configuration with:
      a master-controller including a controller capacitor that is configured to store energy for providing a gate signal, wherein the gate signal is for controlling charging operations to generate the boosted intermediate voltage based on the source voltage,
      a slave-booster operably coupled to the master-controller, the slave-booster including a booster capacitor wherein:
         the slave-booster is configured to generate the output voltage based on charging the booster capacitor, and
         the booster capacitor is configured to store energy according to the gate signal for providing the boosted intermediate voltage, wherein the booster capacitor has greater capacitance level than the controller capacitor, and
      wherein:
         the master-controller is configured to generate the gate signal for controlling the charging operation without directly providing energy to charge the booster capacitor; and
   a secondary booster operatively coupled to the clock booster, the secondary booster configured to generate an output voltage based on the boosted intermediate voltage, wherein the output voltage is greater than the boosted intermediate voltage.

2. The electronic device of claim 1, wherein the electronic device is a double boosted charge pump.

3. The electronic device of claim 1, wherein the master-controller includes:
   a first controller switch including a first portion, a second portion, and a gate portion, wherein the first portion is directly connected to the source voltage and the second portion is directly connected to the controller capacitor;
   a second controller capacitor directly connected to the gate portion of the first controller switch; and
   a second controller switch including a further first portion, a further second portion, and a further gate portion, wherein the further first portion is directly connected to the source voltage, the further second portion is directly connected to the second controller capacitor and the gate portion of the first controller switch, and the further gate portion is directly connected to the controller capacitor and the second portion for receiving the gate signal.

4. The electronic device of claim 3, wherein:
   the controller capacitor is directly connected to a clock signal opposite the first controller switch, wherein the controller capacitor is configured to provide the gate signal based on the clock signal;
   the second controller capacitor is directly connected to a negated signal that complements the clock signal, wherein the second controller capacitor is configured to provide a further control voltage based on the negated signal; and
   the first controller switch is configured to operate based on the further control voltage.

5. The electronic device of claim 3, wherein the slave-booster includes:
   a first slave-booster directly connected to the gate portion of the first controller switch, the further second portion of the second controller switch, the second controller capacitor, or a combination thereof; and
   a second slave-booster directly connected to the further gate portion of the second controller switch, the controller capacitor, the second portion of the first controller switch, or a combination thereof.

6. The electronic device of claim 5, wherein:
the first slave-booster is directly connected to a clock signal; and
the second slave-booster is directly connected to a negated signal that complements the clock signal.

7. The electronic device of claim 1, wherein the slave-booster includes one or more booster switches with each of the one or more booster switches including a gate portion directly connected to the controller capacitor for receiving the gate signal, a first portion directly connected to the source voltage, and a second portion directly connected to the booster capacitor.

8. The electronic device of claim 7, wherein the slave-booster includes booster circuit groupings, wherein each of the booster circuit groupings include the one or more booster switches directly connected to multiple capacitors including the booster capacitor, and the multiple capacitors from all groupings are directly connected to each other.

9. The electronic device of claim 8, wherein the booster circuit groupings are implemented using circuits formed in a silicon wafer.

10. The electronic device of claim 9, wherein the booster circuit groupings are substantially uniformly spaced apart within the silicon wafer for an even physical distribution of the booster circuit groupings.

11. The electronic device of claim 1, wherein:
the slave-booster is directly connected to the secondary booster; and
the master-controller is not directly connected to the secondary booster.

12. The electronic device of claim 1, wherein the booster capacitor has a booster capacitance level that is greater by a factor of 10 or more in comparison to a controller capacitance level of the controller capacitor.

13. The electronic device of claim 1, wherein the secondary booster is a Favrat booster circuit.

14. The electronic device of claim 1, wherein the electronic device includes multiple charge stages that each include the clock booster and one of multiple secondary booster circuits, wherein the secondary booster circuits include the secondary booster and are connected in series across the charge stages to generate the boosted intermediate voltage and the clock boosters are parallel to each other across the charge stages.

15. The electronic device of claim 1, further comprising a switching module directly connected to the clock booster and the secondary booster, wherein the switching module is configured to route the boosted intermediate voltage from the clock booster as an input to the secondary booster.

16. The electronic device of claim 15, wherein the switching module includes a set of signal paths for routing the boosted intermediate voltage.

17. The electronic device of claim 16, wherein each of the signal paths include a routing switch, a complementary switch, or a combination thereof, wherein the routing switch is biased complementary to the complementary switch.

18. The electronic device of claim 15, wherein the switching module includes a first routing switch, a second routing switch, a first complementary switch, a second complementary switch, or a combination thereof, wherein the first routing switch and the second routing switch are biased complementary to the first complementary switch and the second complementary switch.

19. A double boosted charge pump, comprising:
a clock booster configured to generate a boosted intermediate voltage greater than a source voltage, wherein the clock booster includes:
a master-controller configured to generate a gate signal for controlling charging operations to generate the boosted intermediate voltage based on the source voltage, and
a slave-booster directly connected to the master-controller, the slave-booster configured to generate the boosted intermediate voltage according to the source voltage based on the charging operations; and
a secondary booster operatively coupled to the clock booster, the secondary booster configured to generate an output voltage based on using the boosted intermediate voltage to charge capacitors without using the source voltage to charge capacitors, wherein the output voltage is greater than the boosted intermediate voltage.

20. The double boosted charge pump of claim 19, wherein:
the master-controller includes a controller capacitor configured to store energy for generating the gate signal; and
the slave-booster includes a booster capacitor configured to store energy according to the gate signal for generating the booster output, wherein the booster capacitor has greater capacitance level than the controller capacitor.

21. The double boosted charge pump of claim 20, wherein:
the controller capacitor has a controller capacitance level; and
the booster capacitor has a booster capacitance level greater than the controller capacitance level by a factor of 2 or more.

22. The double boosted charge pump of claim 19, wherein the master-controller includes:
a first controller capacitor configured to store energy for generating the gate signal;
a second controller capacitor operably coupled to the first controller capacitor, the second controller configured to store energy for generating the gate signal;
a first controller switch including a first controller input, a first controller gate, and a first controller output configured to control the charging operation, wherein:
the first controller input is directly connected to the source voltage,
the first controller output is directly connected to the first controller capacitor, and
the first controller gate is directly connected to the second controller capacitor; and
a second controller switch including a second controller input, a second controller gate, and a second controller output configured to control the charging operation, wherein:
the second controller input is directly connected to the source voltage,
the second controller output is directly connected to the second controller capacitor and the first controller gate, and
the second controller gate is directly connected to the first controller capacitor and the first controller output.

23. The double boosted charge pump of claim 22, wherein:
the first controller capacitor is directly connected to a clock signal for storing the energy; and
the second controller capacitor is directly connected to a negated signal that complements the clock signal.

24. The double boosted charge pump of claim 22, wherein the slave-booster includes:

a first slave-booster including a first booster switch and a first booster capacitor, wherein:
the first booster switch is configured to control charging operations for generating the boosted intermediate voltage, the first booster switch includes:
a first booster gate a directly connected to the first controller gate of the first controller switch and the second controller capacitor,
a first booster input directly connected to the source voltage, and
a first booster output directly connected to the first booster capacitor; and
the first booster capacitor is configured to store energy for generating the boosted intermediate voltage as an input for the secondary booster; and
a second slave-booster including a second booster switch and a second booster capacitor, wherein:
the second booster switch is configured to control charging operations for generating the boosted intermediate voltage, wherein the second booster switch includes:
a second booster gate a directly connected to the second controller gate of the second controller switch and the first controller capacitor,
a second booster input directly connected to the source voltage, and
a second booster output directly connected to the second booster capacitor; and
the second booster capacitor is configured to store energy for generating the boosted intermediate voltage as an input for the secondary booster.

* * * * *